United States Patent
Tamura et al.

(10) Patent No.: US 6,236,964 B1
(45) Date of Patent: May 22, 2001

(54) SPEECH RECOGNITION APPARATUS AND METHOD FOR MATCHING INPUTTED SPEECH AND A WORD GENERATED FROM STORED REFERENCED PHONEME DATA

(75) Inventors: Junichi Tamura, Tokyo; Tetsuo Kosaka; Atsushi Sakurai, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/194,807

(22) Filed: Feb. 14, 1994

Related U.S. Application Data

(63) Continuation of application No. 07/648,148, filed on Jan. 30, 1991, now abandoned.

(30) Foreign Application Priority Data

Feb. 1, 1990 (JP) .................................................... 2-23205
Dec. 28, 1990 (JP) .................................................. 2-408935

(51) Int. Cl.[7] .................................................... G10L 5/06
(52) U.S. Cl. ................................ 704/254; 704/238; 704/239
(58) Field of Search .................................. 395/2.4–2.66; 381/41–45; 704/231, 237, 236, 238, 239, 240, 241, 243, 244, 246, 250, 251, 255, 254, 249, 256, 257

(56) References Cited

U.S. PATENT DOCUMENTS

| | | | | |
|---|---|---|---|---|
| 4,349,700 | * | 9/1982 | Pirz et al. | 704/241 |
| 4,489,433 | * | 12/1984 | Suehiro et al. | 395/2 |
| 4,736,429 | * | 4/1988 | Niyada et al. | 395/2.51 |
| 4,985,924 | * | 1/1991 | Matsuura | 704/254 |
| 5,033,087 | * | 7/1991 | Bahl et al. | 395/2 |
| 5,131,043 | * | 7/1992 | Fujii et al. | 395/2 |
| 5,133,012 | * | 7/1992 | Nitta | 395/2 |
| 5,315,689 | * | 5/1994 | Kanazawa et al. | 395/2.53 |

* cited by examiner

Primary Examiner—Richemond Dorvil
(74) Attorney, Agent, or Firm—Fitzpatrick, Cella, Harper & Scinto

(57) ABSTRACT

A speech recognition method and apparatus in which a speech section is sliced by the unit of a word by spotting and candidate words are selected. Next, in a second stage, matching is conducted by the unit of a phoneme. Consequently, selection of the candidate words and slicing of the speech section can be performed concurrently. Furthermore, narrowing of the candidate words is facilitated. Furthermore, since reference phoneme patterns under a plurality of environments are prepared, recognition of an input speech under a larger number of conditions is possible using a smaller amount of data when compared with the case in which reference word patterns under a plurality of environments are prepared.

2 Claims, 21 Drawing Sheets

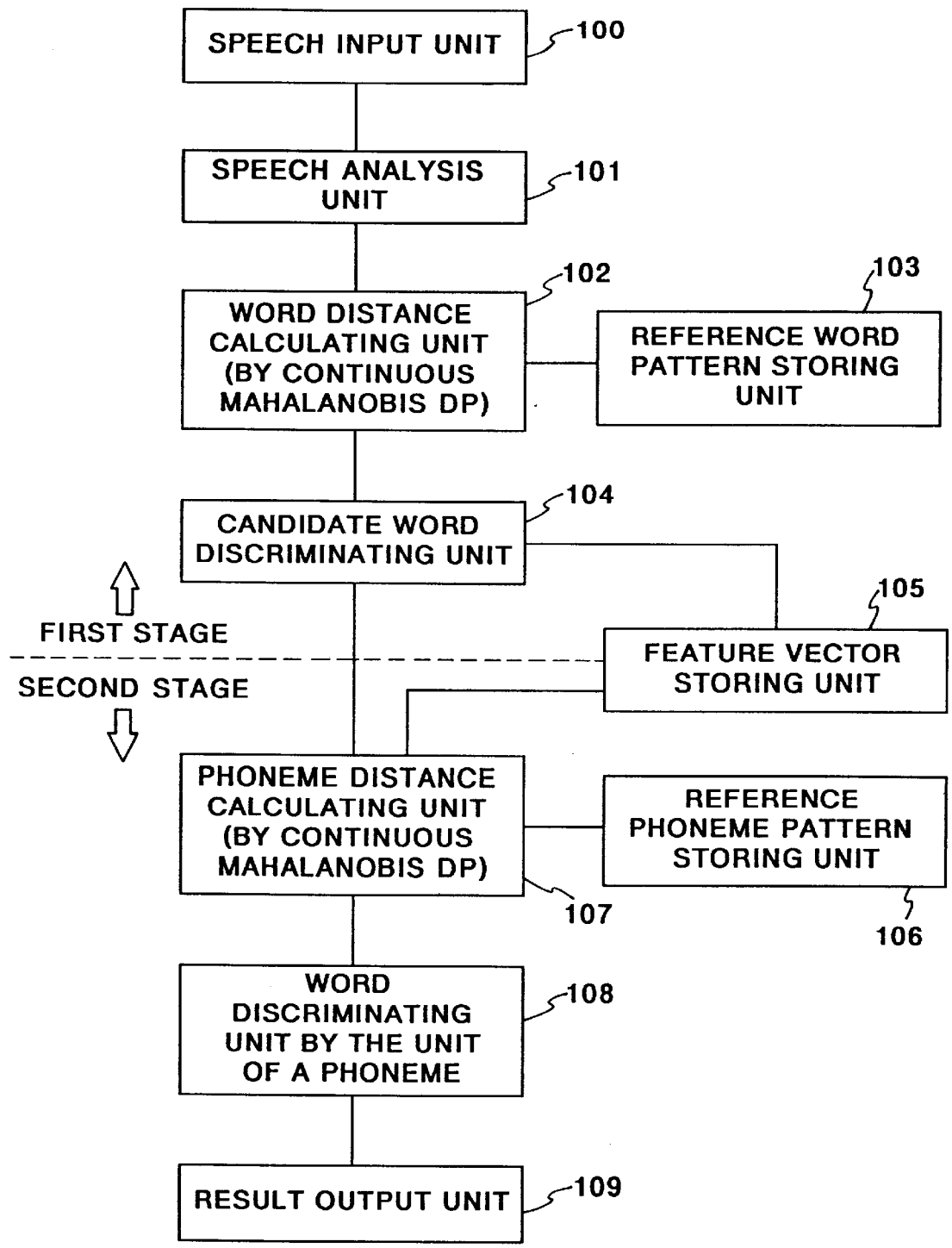
F I G. 1

| FACTOR OF INCREASE / PHONEME | 2 | 3 | 4 | - - - |
|---|---|---|---|---|
| a | 2 | 3 | 4 | - - - |
| i | 2 | 3 | 4 | - - - |
| ⋮ | ⋮ | ⋮ | ⋮ | - - - |
| p | 1 | 1 | 1 | - - - |
| t | 1 | 1 | 2 | - - - |
| k | 1 | 2 | 2 | - - - |
| ⋮ | ⋮ | ⋮ | ⋮ | - - - |
| r | 1 | 2 | 2 | - - - |
| ⋮ | ⋮ | ⋮ | ⋮ | - - - |

F I G. 5B

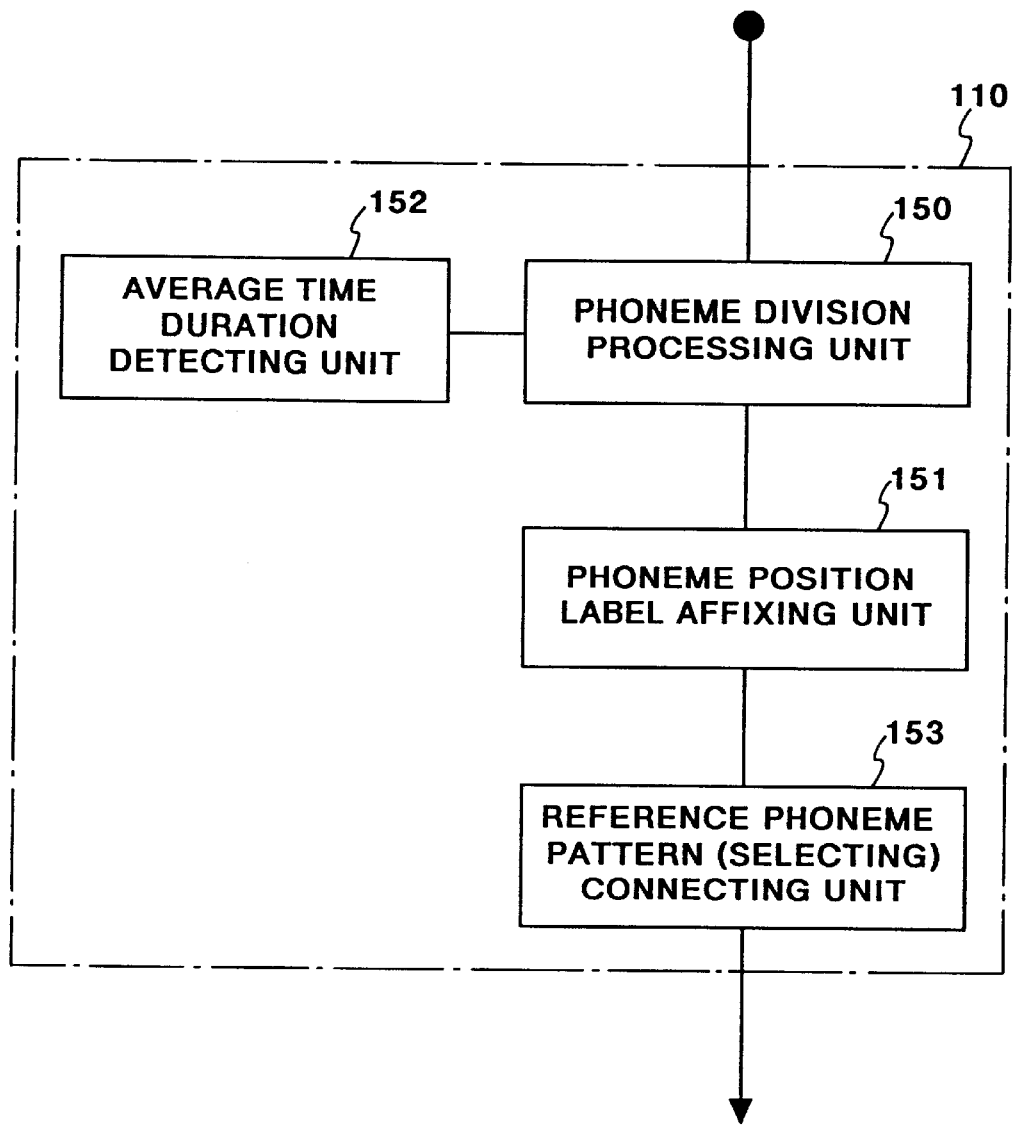
F I G. 7

| t o | o k u | u s i | i m a | a s i |
|---|---|---|---|---|
| 726-1<br>726-1.1 | 641-1<br>641-1.3 | 906-1 | 272-1 | 907-1<br>907-1.2 |

| f u | u k u | u s i | i m a | a s i |
|---|---|---|---|---|
| 858-1<br>858-1.1 | 642-1<br>642-1.3 | 906-1 | 272-1 | 907-1<br>907-1.2 |

| h i | i r o | o s i | i m a | a s i |
|---|---|---|---|---|
| 852-1<br>852-1.1 | 86-1<br>86-1.3 | 911-1 | 272-1 | 907-1<br>907-1.2 |

FIG. 8C

EXAMPLE OF ADDRESS - - - D1 - D2 . D3

D1 — ADDRESS INDICATING THE TYPE OF PHONEME
D2 — TIME PERIOD OF REFERENCE PHONEME PATTERN
      (EX. 1, 2, 3, 4, - - - -)
D3 — TYPE OF REFERENCE PHONEME PATTERN
      (EX. VOICELESS OR PARTIALLY VOICELESS SOUND - - - -)

| TYPE OF PHONEME | ADDRESS |
|---|---|
| /a/ | 0001 |
| /a-/ | 0002 |
| /i/ | 0003 |
| /i-/ | 0004 |
| /u/ | 0005 |
| /u-/ | 0006 |
| /aa/ | 0011 |
| /ia/ | 0012 |
| /ua/ | 0013 |
| /ja/ | 0036 |
| /aja/ | 0037 |
| /ija/ | 0038 |
| /uja/ | 0039 |
| /eja/ | 0040 |
| /sa/ | 0930 |
| /asa/ | 0931 |
| /asi/ | 0932 |
| /asu/ | 0933 |

| PHONEME | ADDRESS (VOICED) | (VOICELESS) | VCV (PARTIALLY VOICELESS) | VCV (PARTIALLY VOICELESS) |
|---|---|---|---|---|
| /a/ | 001 - 1 | 001 - 1.1 | — | — |
| /a-1/ | 002 - 1 | 002 - 1.1 | — | — |
| - - - | - - - | - - - | - - - | - - - |
| /sa/ | 930 - 1 | 930 - 1.1 | 930 - 1.2 | 930 - 1.3 |
| /asa-/ | 931 - 1 | 931 - 1.1 | 931 - 1.1 | 930 - 1.3 |
| - - - | - - - | - - - | - - - | - - - |
| /a/ | 001 - 2 | 001 - 2.1 | — | — |
| /a-1/ | 002 - 2 | 002 - 2.1 | — | — |
| - - - | - - - | - - - | - - - | - - - |
| /sa/ | 930 - 2 | 930 - 2.1 | 930 - 2.2 | 930 - 2.3 |
| /asa-/ | 931 - 2 | 931 - 2.1 | 931 - 2.2 | 930 - 2.3 |
| - - - | - - - | - - - | - - - | - - - |

|     | to    | oku    | usi   | ima   | asi     |
|-----|-------|--------|-------|-------|---------|
| (1) | 726-1 | 641-1  | 906-1 | 272-1 | 907-1   |
| (2) | 726-1 | 641-1  | 906-1 | 272-1 | 907-1.2 |
| (3) | 726-1.1 | 641-1.3 | 906-1 | 272-1 | 907-1   |
| (4) | 726-1.1 | 641-1.3 | 906-1 | 272-1 | 907-1.2 |

COMBINATIONS OF REFERENCE PATTERNS GENERATED FROM PHONEME ARRANGEMENT / CONNECTION REGULATIONS

FIG. 8D

| b   | / | b   |
|-----|---|-----|
| b   | / | b.2 |
| b.1 | / | b.1 |
| b.1 | / | b.3 |
| b.2 | / | b.1 |
| b.2 | / | b   |
| b.3 | / | b   |
| b.3 | / | b.2 |

FIG. 8E

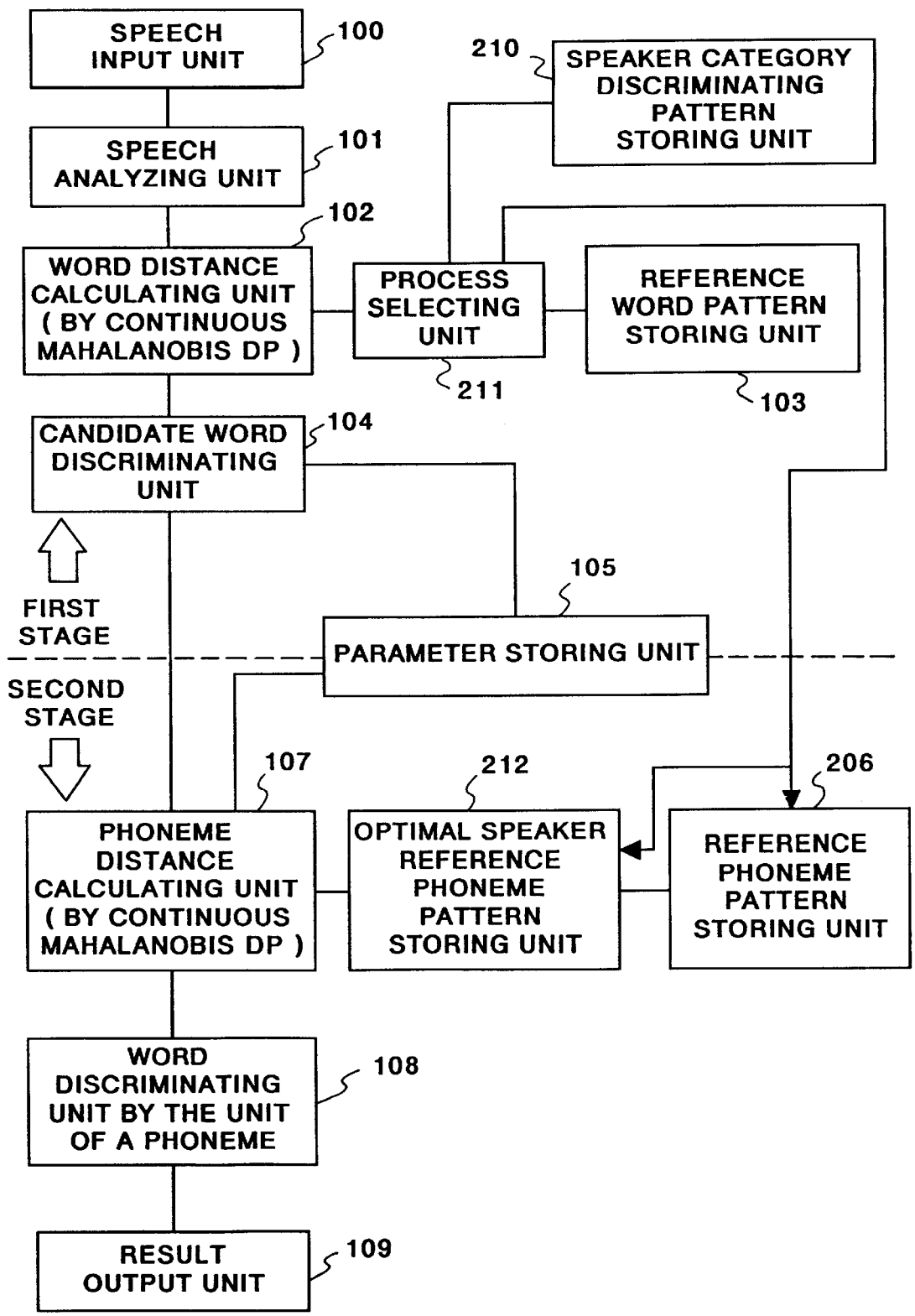
F I G. 10

| SPEAKER i | TIME SERIES OF FEATURE VECTOR "a, i, u, e, o" |
|---|---|
| i = 1 | $V_1^1$ $V_2^1$ $V_3^1$ ---------------- $V_\ell^1$ |
| i = 2 | $V_1^2$ $V_2^2$ $V_3^2$ ---------------- $V_m^2$ |
| i = 3 | $V_1^3$ $V_2^3$ $V_3^3$ ---------------- $V_n^3$ |
| ⋮ | ⋮ ⋮ ---------------- ⋮ |
| i = K | $V_1^K$ $V_2^K$ $V_3^K$ ---------------- $V_o^K$ |
| ⋮ | ⋮ ⋮ ---------------- ⋮ |
| i = 5000 | $V_1^{5000}$ $V_2^{5000}$ $V_3^{5000}$ ---------------- $V_p^{5000}$ |

| SPEAKER CATEGORY | TYPE OF PHONEME | TIME SERIES OF REFERENCE PHONEME PATTERN |
|---|---|---|
| 1 | $a_1$ | $V'_{a_11}$ $V'_{a_12}$ ------- $V'_{a_1j}$ |
| | $a_1$ | $V'_{a_21}$ $V'_{a_22}$ ------- $V'_{a_2k}$ |
| | $i_1$ | $V'_{i_11}$ $V'_{i_12}$ ------- $V_{ia_1\ell}$ |
| | $i_2$ | |
| | $u_1$ | |
| | ⋮ | |
| | $k_2$ | |
| | $h_1$ | |
| | $ci_1$ | |
| | $ci_2$ | |
| | $ci_3$ | |
| | $ci_4$ | $V'_{ci_41}$ $V'_{ci_42}$ ------ $V'_{ci_4m}$ |
| | | |
| 9 | $a_1$ | $V^9_{a_11}$ $V^9_{a_12}$ ------ $V^9_{a_1n}$ |
| | $i_1$ | $V^9_{i_11}$ $V^9_{i_12}$ ------- $V^9_{i_1o}$ |
| | $i_2$ | $V^9_{i_21}$ $V^9_{i_22}$ -------- $V^9_{i_2p}$ |
| | $u_1$ | |
| | ⋮ | |
| | $m_3$ | |
| | $shi_1$ | |
| | $shi_2$ | |
| | $k_1$ | |
| | $h_1$ | |
| | $ci_1$ | $V^9_{ci_11}$ $V^9_{ci_12}$ ------ $V^9_{ci_1q}$ |
| | $ci_2$ | $V^9_{ci_21}$ $V^9_{ci_22}$ ------ $V^9_{ci_2r}$ |

FIG. 12A

| SPEAKER CATEGORY | TYPE OF PHONEME | TIME SERIES OF REFERENCE PHONEME PATTERN | TYPE OF PHONEME | TIME SERIES OF REFERENCE PHONEME PATTERN |
|---|---|---|---|---|
| 1 | a1<br>a2<br>--- | Va11 ------<br>Va21 ------<br> | | ------<br> <br>--- |
| | | JAPANESE | | |
| n | a1<br>a2<br>--- | Va1n ------<br>Va2n ------<br> | | ------<br> <br>--- |
| | | ENGLISH | | |

SPEECH RECOGNITION APPARATUS AND METHOD FOR MATCHING INPUTTED SPEECH AND A WORD GENERATED FROM STORED REFERENCED PHONEME DATA

This application is a continuation of application Ser. No. 07/648,148 filed Jan. 30, 1991, now abandoned.

BACKGROUND OF THE INVENTION

1. Field of the Invention

The present invention relates to a speech recognition method and apparatus therefor, and more particularly, to a speech recognition method and apparatus therefor for recognizing a speech, such as a word, uttered continuously by an unspecified speaker.

2. Description of the Prior Arts

Among various types of known unspecified speaker recognition techniques, the most commonly used unspecified speaker recognizing system will be described below.

FIG. 15 shows the configuration of a recognition system which handles large unspecified vocabularies. A speech input from a speech input unit 1 is sent to a speech analysis unit 2 where a filter bank output including the power term of a speech or feature parameter, such as LPC cepstrum, of the input speech is obtained. Compression (dimension compression by the K–L transform in the case of the filter bank output) of the parameters is also conducted in the speech analysis unit 2. Since analysis is conducted by the unit of a frame, the compressed feature parameter is hereinafter referred to as a feature vector.

Next, the phoneme boundary is determined in the continuously uttered speech by a phoneme boundary detecting unit 3. Subsequently, a phoneme discriminating unit 4 determines phonemes by a statistical technique. A reference phoneme pattern storing unit 5 stores reference phoneme patterns created from a large amount of phoneme samples. A word discriminating unit 6 outputs a final recognition result from a word dictionary 7 using the results of the output of the phoneme discriminating unit 4 or by performing modification on the candidate phonemes by means of a modification regulating unit 8. The results of the recognition are displayed by a recognition result display unit 9.

Generally, the phoneme boundary detecting unit 3 uses functions or the like for discrimination. The phoneme discriminating unit 4 also conducts discrimination using the functions. Candidates which satisfy a predetermined threshold are output from each of these components. A plurality of phoneme candidates are output for each phoneme boundary. Therefore, the word discriminating unit 6 narrows a final word using the top-down information stored in the components 7 and 8.

However, since the aforementioned conventional recognition system basically has a bottom-up structure, in a case when errors are generated at a certain point in the recognition process, the following process will be readily affected adversely. For example, in the case when phoneme boundary is erroneously determined in the phoneme boundary detecting unit 3, the operation by the phoneme discriminating unit 4 or the word discriminating unit 6 may be greatly affected. That is, the final speech recognition rate is lowered in proportion to the product of the error rates of the individual processes. It is therefore impossible to attain a high recognition rate.

Furthermore, in the case of a recognition apparatus designed for the recognition of unspecified speakers, setting of a threshold value used for determination made in each process is very difficult. Setting of a threshold value which ensures that an objective is contained in the candidates increases the number of candidates in each process and hence makes accurate narrowing of the plurality of candidate words very difficult. Furthermore, when the recognition apparatus is used in an actual environment, unsteady-state noises are generated to a large excess, thus lowering the recognition rate even for a recognition apparatus designed to handle a small number of words.

SUMMARY OF THE INVENTION

An object of the present invention is to provide a speech recognition method which is capable of recognizing speech continuously uttered by a given speaker at a high recognition rate, and a speech recognition apparatus therefor.

Another object of the present invention is to provide a speech recognition method which comprises the two stages and selects candidate words concurrently with the slicing of the speech section by the unit of a word by spotting, and which conducts matching by the unit of a phoneme so as to allow selection of the candidate words and slicing of the speech section to be conducted at the same time and so as to allow reducing the number of candidate words to be facilitated, and a speech recognition apparatus therefor.

Another object of the present invention is to provide a speech recognition method in which reference phoneme patterns under a plurality of environments are prepared so as to allow input speech under a larger number of conditions to be recognized using a smaller amount of data when compared with the case in which reference word patterns under a plurality of environments are prepared, and a speech recognition apparatus therefor.

Another object of the present invention is to provide a speech recognition method which performs spotting by the unit of a word in a first stage to obtain the speech section and the candidate words, and makes comparison in the second stage between the candidate words and the reference phoneme patterns prepared in a plurality of numbers for respective characteristics of speech so as to allow more accurate speech recognition to be achieved and thereby allow the recognition rate to be enhanced.

Other objects and advantages of the invention will become apparent during the following discussion of the accompanying drawings.

BRIEF DESCRIPTION OF THE DRAWINGS

FIG. 1 shows the basic configuration of a first embodiment of a processing system according to the present invention;

FIG. 5B shows the magnification of phonemes caused by changes in the magnification of the uttered time period;

FIG. 7 shows the configuration of a reference pattern generation regulating unit;

FIG. 8C shows the addresses for various types of reference phoneme patterns;

FIG. 8D shows combinations of reference patterns generated;

FIG. 8E shows a combination of reference patterns that can be connected;

FIG. 10 is a block diagram of a second embodiment of the processing system according to the present invention;

FIG. 12A shows the data format of the speaker category;

FIG. 12B shows the data format when a speaker category is obtained for each of a plurality of languages;

DESCRIPTION OF THE PREFERRED EMBODIMENTS

<First embodiment>

Figure 2:
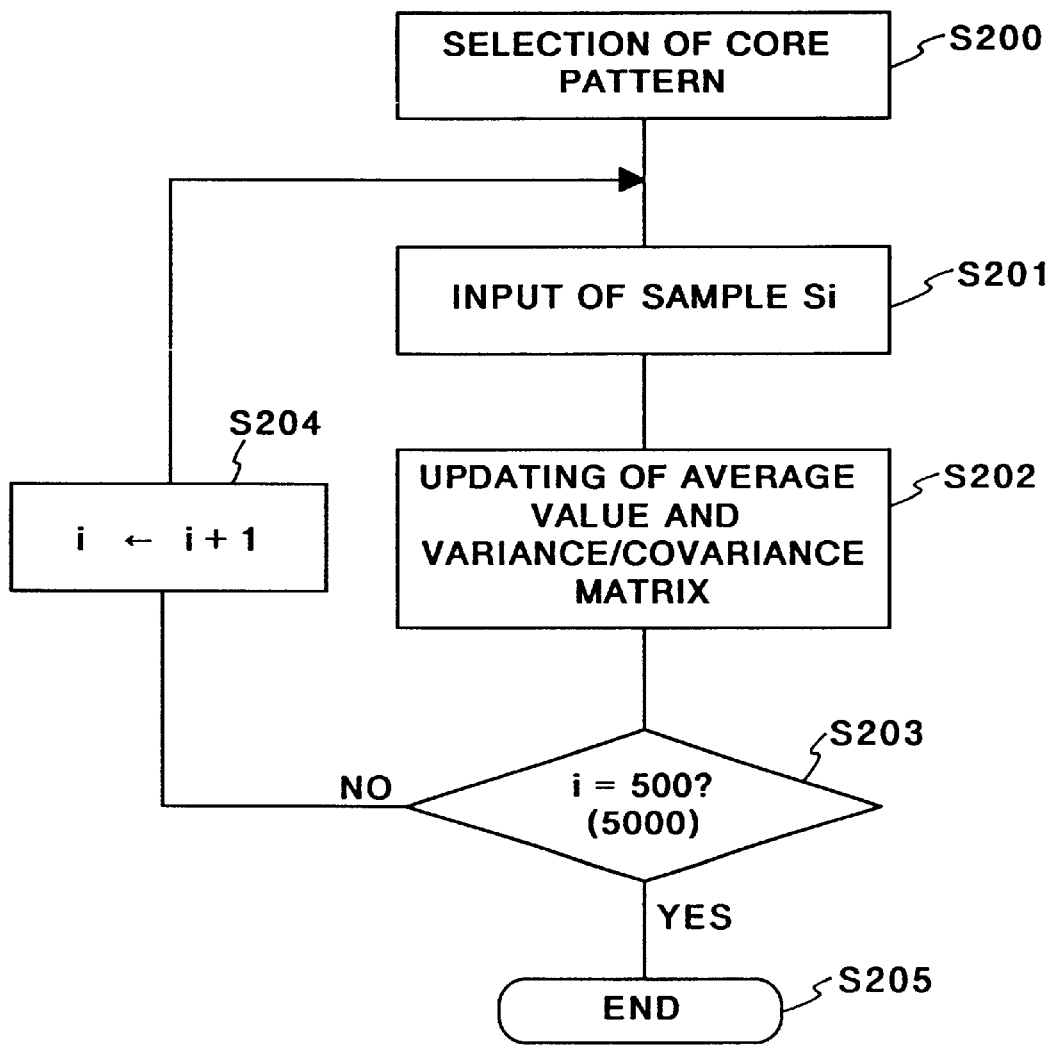
FIG. 2 is a flowchart of the operation of creating reference patterns.

FIG. 1 shows the basic configuration of a first embodiment of a speech recognition system according to the present invention. The speech recognition system includes a speech input unit 100, a speech analysis unit 101 for analyzing and compressing the speech input by the input unit 100 to convert it into a time series of a feature vector, a reference word pattern storing unit 103 for storing reference patterns obtained from the word data uttered by a large number of speakers, a word distance calculating unit 102 using the continuous Mahalanobis DP for calculating the distance using the continuous Mahalanobis DP for each frame of the input data from the time series of the feature pattern input from the speech analysis unit 101 and from various reference patterns stored in the reference word pattern storing unit 103, a candidate word discriminating unit 104 for discriminating a candidate word from among the reference word patterns using the distance between each frame and the reference word pattern which is obtained by the continuous Mahalanobis DP, a feature vector storing unit 105 for storing the time series of at least one feature vector for the candidate word, a reference phonemic pattern storing unit 106 for storing reference patterns created by the unit of a phoneme from the speech uttered by a large number of speakers, a phonemic distance calculating unit 107 using the continuous Mahalanobis DP for calculating the distance between the input data and the reference phonemic pattern using the continuous Mahalanobis DP by the unit of phoneme on the time series of the feature vector for the candidate word, a word recognizing unit 108 operating by the units of phonemes for recognizing and outputting the most appropriate word from the phoneme rows on which matching is performed on at least one candidate word, and a result output unit 109 for outputting the speech recognition results by means of, for example, an audio response. In FIG. 1, the first portion conducts taking out of the speech and selection of word candidates, and the second portion conducts recognition of the candidate word in units of phonemes.

Next, the flow of the process will be described.

First, the speech input unit 100 inputs an audio signal from a microphone, and transmits the input waveform to the speech analysis unit 101. The speech input unit 100 keeps taking in speech or noise signals during the reception of the speech to transmit the speech waveform to the speech analysis unit 101 in a digitally converted form. The speech analysis unit 101 analyzes the waveform which is inputted from the speech input portion 100 in a window ranging from 10 msec to 30 msec to obtain a feature parameter for each frame having a length of 2 msec to 10 msec. Types of feature parameters that can be used in the present embodiment include the LPC cepstrum capable of being analyzed at a relatively high speed, the LPC melcepstrum, the FFT cepstrum suitable for highly accurate extraction, the FFT melcepstrum, and the filter bank output. Also, a feature pattern most suitable to the conditions under which the system is used may be obtained for each frame by using normalized power information or by multiplying each dimension of the feature parameter by a weighting factor.

Next, compression is conducted on the dimensions of the obtained feature parameters. In the case of the cepstrum parameter, only the required dimensions (for example, the sixth dimension) are in general extracted from among the first to twelfth dimensions of the factor as the feature vector. In the case of the filter bank output, compression is conducted on the dimensions by means of the orthogonal transform, such as a K–L transform or a Fourier transform, to obtain a lower dimensional term. Hereinafter, the compressed feature parameter for one frame is called a feature vector, and the time series of the compressed feature vector are called the time series of the feature vector.

In this embodiment, the length of the analysis window is set to 25.6 msec, and the frame period is set to 10 msec. The Melcepstrum factor is obtained as the feature parameter from the spectrum envelope which passes through the peak of the FFT spectrum, and the second to sixth dimensions of the factor are compressed to obtain a feature vector for one frame. The zero dimension of the melcepstrum represents power.

Next, the method of creating the reference patterns stored in the reference word pattern storing unit 103 will be described below. In this system, recognition of a total of seventeen words, including "zero (zero), san (three), ni (two), rei (zero), nana (seven), yon (four), go (five), maru (zero), shi (four), roku (six), ku (nine), haci (eight), shici (seven), kyu (nine), ici (one), hai (yes) and iie (no), and deformed speeches thereof, will be described. Hereinafter, words are expressed in the format of "procunciation in Japanese (meaning in English)". The reference pattern is created from the words uttered by a large number of speakers. In this embodiment, speech samples of fifty people are used to create the reference pattern of one word. The greater the number of speech samples, the better.

FIG. 2 is a flowchart of the reference pattern creation procedure.

First, a core pattern (nuclear pattern), which serves as a virtual object for comparison when the reference pattern is created from the speech sample, is selected (S200). In this step, a sample having the most average speech time length and speech pattern is selected from among fifty speech samples. Next, a sample speech is input (S201), and time base expansion/compression matching is conducted between the input sample and the core pattern to obtain the average vector and variance covariance matrix of the feature vector for each frame along the matching path which ensures the time normalized distance is at a minimum (S203, S205). DP matching is used as the time base expansion/compression matching. Next, the speaker No. of the input sample is changed in sequence (S204), and the average value and variance covariance matrix of the feature vector are obtained for each frame (S203 and S205). The reference word pattern is created for each of the seventeen words by repeating the above-described processings, the created reference word patterns being stored in the reference word pattern storing unit 103.

The word distance calculating unit 102 using the continuous Mahalanobis DP conducts continuous Mahalanobis DP matching between the time series of the feature vector input thereto in sequence and the reference patterns of all the words stored in the reference word pattern storing unit 103 and thereby calculates the distance.

The continuous Mahalanobis DP will now be described in detail. The continuous DP technique is a commonly used technique of searching for an objective word or syllable from among the sentence uttered continuously by a specified speaker. This technique, called word spotting, is an epoch-making one because it is capable of slicing of an objective speech section and recognition thereof simultaneously. In this embodiment, variations in the recognition due to the unspecified property are absorbed by using the Mahalanobis distance as the distance in each frame of the continuous DP technique.

Figure 3:
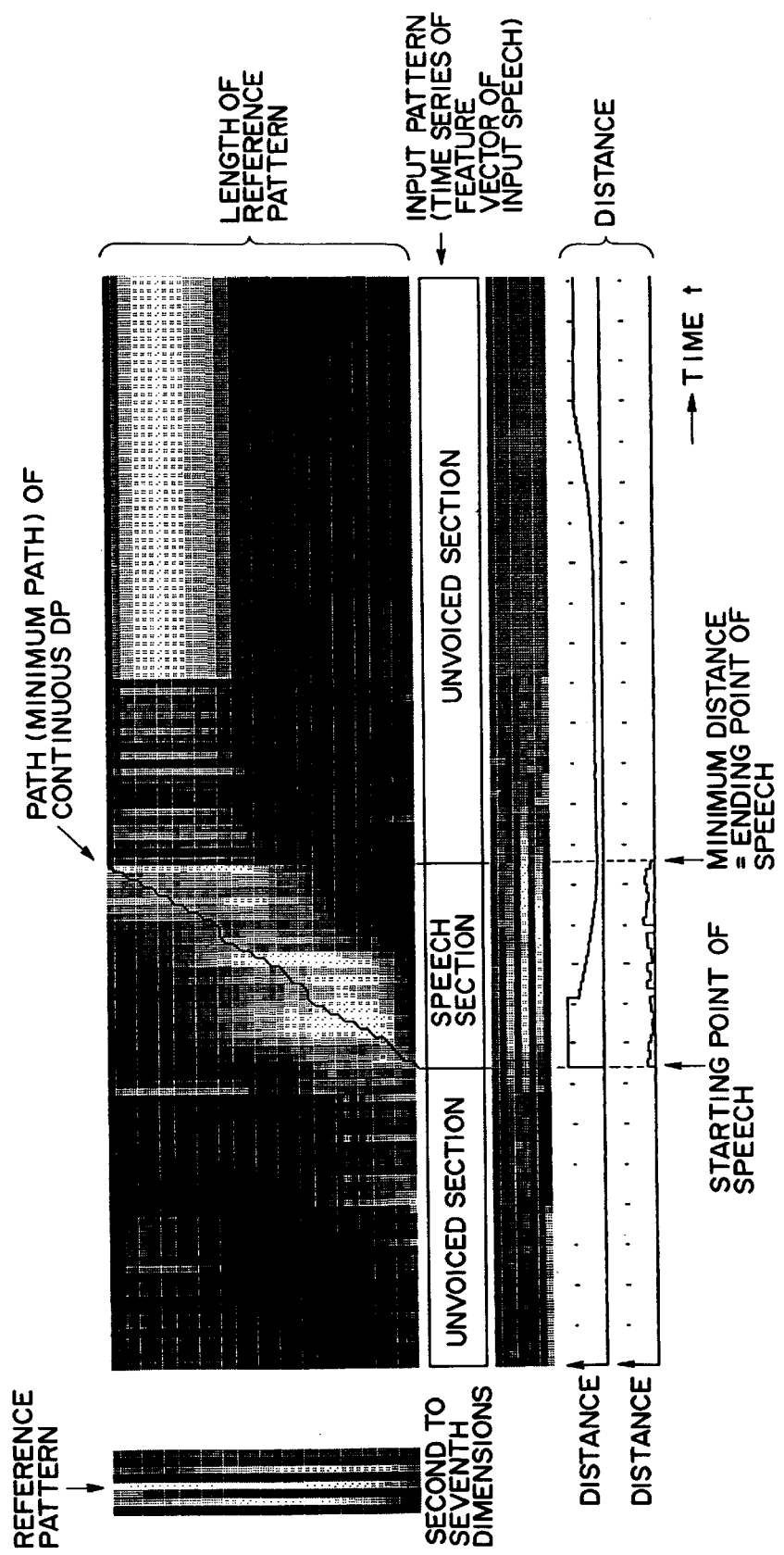
FIG. 3 shows a continuous Mahalanobis DP.

FIG. 3 shows the results of matching by continuous Mahalanobis DP between the reference pattern of the word, "ero" (pronunciation in Japanese) and the time series of the feature vector of the speech input when the word, "ero" is uttered, including the unvoiced portion thereof. In FIG. 3, the thick portion represents the portion in which the distance between the reference pattern and the input pattern is large, and the thin portion is the portion in which the distance is small. Variations in the accumulated distance with time are shown in the second graph from the bottom. The accumulated distance represents the distance of the DP path which is ended at a certain time. The obtained DP path is stored in the memory so that it can be used to obtain the starting point of a speech section.

For example, the DP path at which the distance is at a minimum is shown in FIG. 3. However, in a case where the reference pattern is similar to the input pattern, since the accumulated distance is smaller than a predetermined threshold value, the reference pattern when the distance is at a minimum is recognized as the candidate word. In order to slice the speech section from the input pattern, the starting point of the speech section is obtained by calling the DP path from the memory and by tracing the path backward starting with the time at which the accumulated distance is smaller than the threshold value and is at a minimum. The time series of the feature vector of the thus-obtained speech section are stored in the feature vector storing unit 105. Further, variations in the accumulated distance with each of the predetermined time period are shown at the bottom graph of FIG. 3.

In the aforementioned processing system, the candidate word, the time series of the feature vector obtained by the analysis of the speech section of the candidate word, and the results of the accumulated distance by continuous Mahalanobis DP are obtained. When a plurality of candidate words whose speech section is partially common are selected such as "shici" (seven) and "shi" (four), "shici" (seven) is selected and "shi" (four) is discarded. Similarly, in the case of "roku" (six) and "ku" (nine), since most part of the speech section of "ku" (80% or more in this embodiment) is contained in "roku", "ku" is discarded and examination by the unit of phoneme is conducted only on "roku".

In this embodiment, reference patterns of phonemes, including vowels (a, i, u, e, o) and consonants (z, s, n, r, g, n, shi, k, h, ci), are created and stored in the reference phoneme pattern storing unit 106 beforehand. To create the reference patterns, the same method as that used for the reference word pattern storing unit 103 is used. The phonemic distance calculating unit 107 performs matching of continuous Mahalanobis DP between the sliced speech section stored in the parameter storing unit 105 as the candidate words and the individual phonemes.

Like the word distance calculating unit 102, the phonemic distance calculating unit 107 calculates the phoneme range starting from the point where the accumulated distance is at a minimum. Also, like the candidate word discriminating unit 104, the point where the accumulating distance is at a minimum is made the ending point of that phoneme. The starting point of the phoneme is obtained by tracing the continuous DP path backward.

Figure 4A:
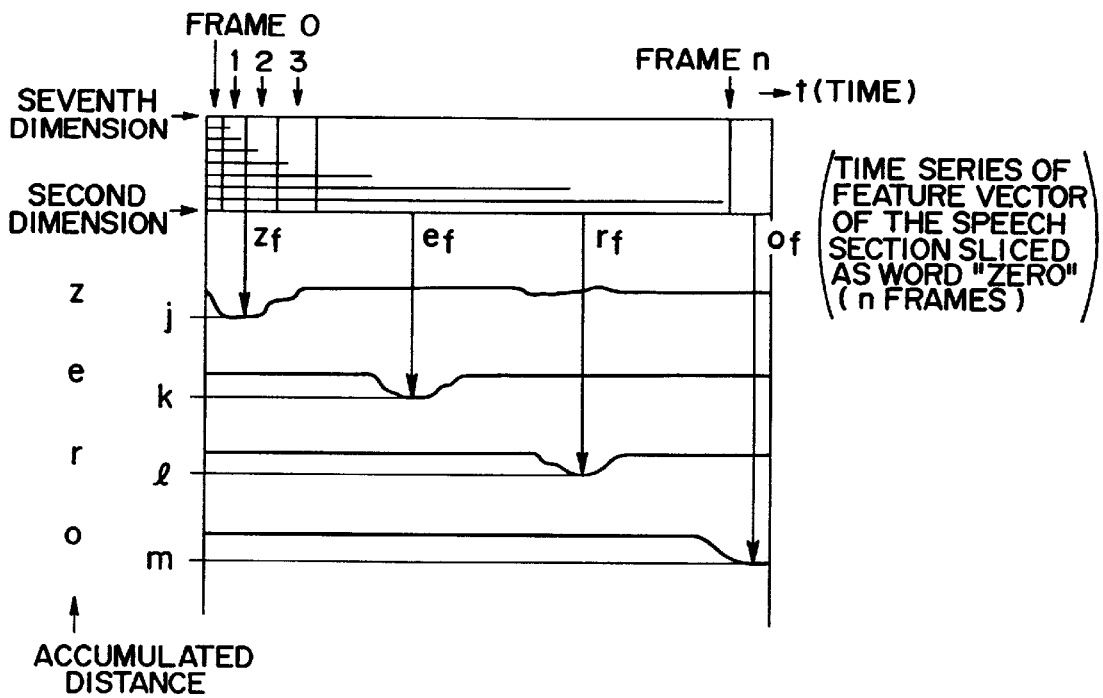
FIG. 4A shows phoneme matching.

In this embodiment, in a case where the candidate word is, for example, "zero", matching is conducted between the speech section, "zero", and the four types of phonemes, including "z", "e", "r", and "o". The positional relation of the points at which the accumulated distances of the phonemes are at a minimum and the average values of the minimum distances, obtained by the matching conducted between the four types of phonemes and the candidate speech section determined as "zero", are shown in FIG. 4A.

The minimum value of the distance of each phoneme and the position thereof represented by the frame are sent to the word recognizing unit 108 by the unit of phoneme. In this embodiment, the minimum value of "z" is "j", and the frame position thereof is "$z_f$". The word recognizing unit 108 by the unit of phoneme performs recognition of a final word on the basis of the data sent from the phonemic distance calculating unit 107 by continuous Mahalanobis DP. First, the word recognizing unit 108 determines whether or not the order of phonemes of the candidate word (the frame position) is $z_f<e_f<r_f<o_f$. If the answer is yes, the word to be recognized is "zero". Therefore, if the average recognized distance $$X = \frac{j + k + l + m}{4}$$

is smaller than the threshold H, "zero" is output as the results of the recognition.

Next, an example of selection of one candidate word from a plurality of them will be described.

Figure 4B:
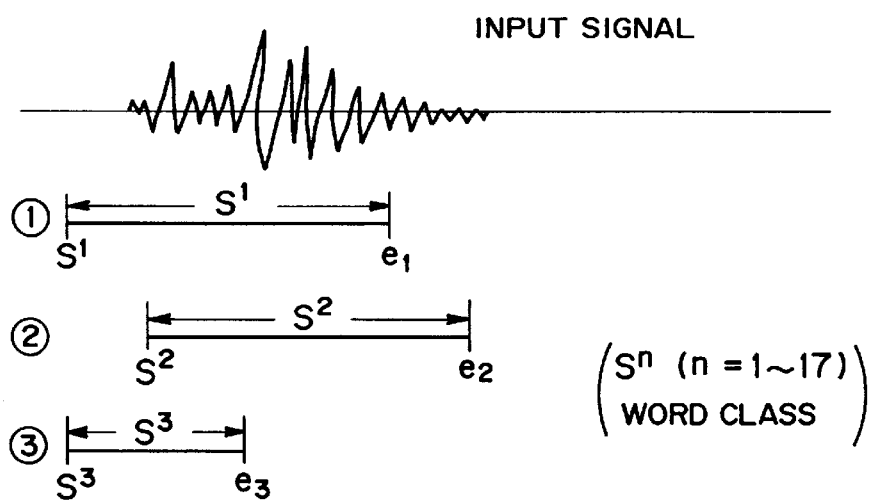
FIG. 4B shows the relationship between a plurality of candidate words and an input signal.

FIG. 4B shows the examples of candidate words (the results of the output of the candidate word discriminating unit 104). In this example of the output, (1) "haci" (eight), (2) "shici" (seven), and (3) "shi" (four) are output as the candidate words. However, only (1) and (2) are regarded as candidate words and recognition at the phonemic level is actually conducted on (1) and (2) because 80% or more of (3) is contained in (1) and because (3) "shi" is present in (2), as stated above.

Case 1: in which it is determined from the matching conducted on the phoneme row "|h|a|c|i|" of word $S^1$ and the phoneme row "|sh|i|c|i|" of word $S^2$ that the order of phonemes of each word is the same as that of the candidate word and the distance of each phoneme in each word is smaller than H (threshold value) → the word having a smaller average accumulated distance X is output.

Case 2: in which the order of phonemes of each word is different from that of the candidate word but the distance of each phoneme in each word is smaller than threshold (H) ⇒ DP matching is conducted between the word and the character row of the phoneme row and the candidate word is determined using the threshold (I) of the distance obtained by the DP matching.

Case 3: in which the order of phonemes is the same as that of the candidate word but the threshold value (H) of each phoneme is not cleared ⇒ rejected.

Case 4: in which the order of phonemes is different and the threshold of the phoneme is not cleared ⇒ rejected.

The method of recognizing the word using the results of the recognition by the unit of phoneme is not limited to the above-described one. As will be described later, the threshold H used for discrimination of the phoneme or the recognition algorithm differs depending upon how the unit of phoneme is defined when the reference pattern is created or upon the preparation of a plurality of patterns for one phoneme. Hence, the recognition algorithm, such as the order of priority between the average accumulated distance and the order of phonemes, may differ.

The speech (word) output from the word recognition unit 108 by the unit of phoneme as the final results is output from the result output unit 109. In a case where recognition is made through a telephone or the like using only the speech information, the results of the recognition may be confirmed using, for example, speech synthesis means by asking a question of "Is it zero?". When it is found from the recognition of the word that the distance is sufficiently small, the subsequent process is performed without the results of the recognition being confirmed.

In the latter half of the aforementioned embodiment in which recognition is made by the unit of phoneme, the reference pattern is created on each of all the phonemes contained in the words to be recognized. However, some phonemes may change their form greatly with changes in the phonetic environments or the speaker. Hence, results of more accurate recognition may be obtained by preparing a plurality of patterns for one phoneme. For example, the vowel |i| may become voiceless, as in the cases of "ici" (one), "haci" (eight) and "shici" (seven). Since in the recognition at the phonemic level strict examination is made on the candidate word and its speech section, a plurality of reference patterns may be created for the vowel |i|, including the voiced vowel |i| and the voiceless vowel |i|. Similarly, in the case of the phoneme |g|, there are |g| in which path is present and |g| in which path is absent. In a case where reference patterns are created for these phonemes, when the dimension of the feature vector for each frame is n, speech data of $n^2+\alpha$ may be required in order to create at least one reference pattern.

More accurate recognition at the phonemic level may be possible by changing the unit of phoneme. In the above-described embodiment, vowels and consonants, such as |a|, |i|, . . . , |m|, |n|, |r|, are handled separately as the unit of speech.

In practice, when a word is continuously uttered in daily life by a human being who is not an announcer or the like, the individual phonemes are not often uttered clearly. The obtained data is mainly composed of a co-articulated portion, and the portions of individual vowels and consonants are very short in time (the co-articulated portion represents the transition (the intermediate portion) from the stationary portion of "i" to the stationary portion "a" in the case of pronunciation of "ia").

Hence, the unit of phoneme is made VCV type containing the co-articulated portion. CV is used for the beginning of a word. In this way, the possibility that the order varies reduces when the plurality of candidate words appear as in the case of the aforementioned embodiment, and discrimination of the final word is thus facilitated. In the above-description, V represents a vowel, and C represents a consonant. VCV represents the chain of vowel—consonant—vowel. The reference pattern for the VCV is created from the sample sliced from the continuous speech.

The multi-patterns of the phonemes stored in the reference phonemic pattern storing unit 106 and the definition of the phonemic unit have been described in the above.

The same things apply to the reference word pattern storing unit 103. However, strict categorization of the reference word patterns may increase the number of patterns excessively. Also, it is not easy to collect speech samples of individual words from a large number of speakers and analyze them. Therefore, categorization is made using the uttered time period of the individual words.

In the first stage of the recognition system according to the present invention, it is essential that the candidate words absolutely contain the objective word. In this system, since time expansion/compression matching is basically conducted, a word having a period of uttered time deviating from the reference pattern may be rejected.

Hence, multi-reference patterns may be prepared so that the total time periods of utterance of the cooperative speakers can be covered. At that time, since it is difficult for the samples having an excessively long utterance to be obtained, the number of frames of the average feature vector may be doubled or tripled, as shown in FIG. 5A.

Figure 5A:
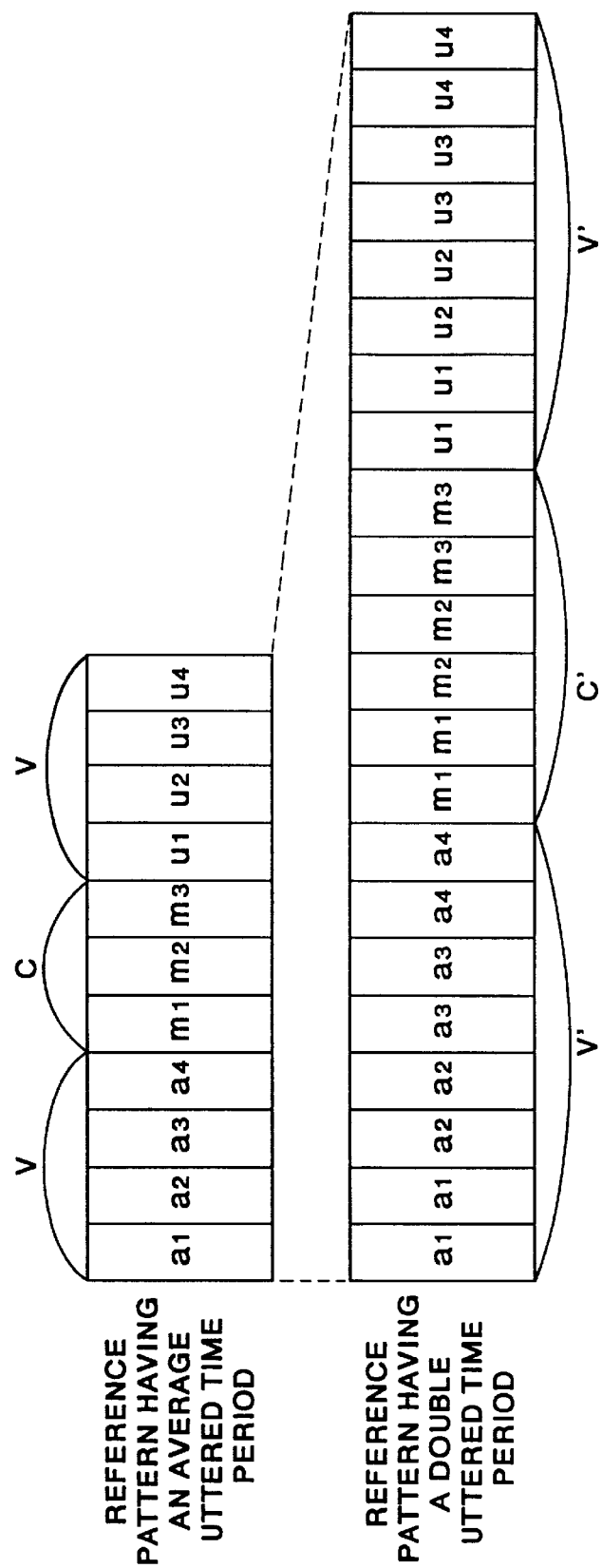
FIG. 5A shows a reference pattern whose uttered time period is doubled.

FIG. 5A shows the example in which the period of time of utterance of the basic pattern, consisting of phonemes of |a|m|u|, is doubled.

When the time period of utterance is to be enlarged, care must be taken when the word contains an explosive consonant, such as |p|, |t|, or |k|. In that case, even when the time period of utterance is prolonged, the time period of utterance of the consonant portion remains substantially the same. Hence, means of changing the enlargement method for each consonant by means of, for example, table may be used to facilitate creation of accurate reference patterns having different time periods.

To create better reference patterns, speech samples having a long time period of utterance are collected and the reference pattern is created from the collected data.

Figure 5C:
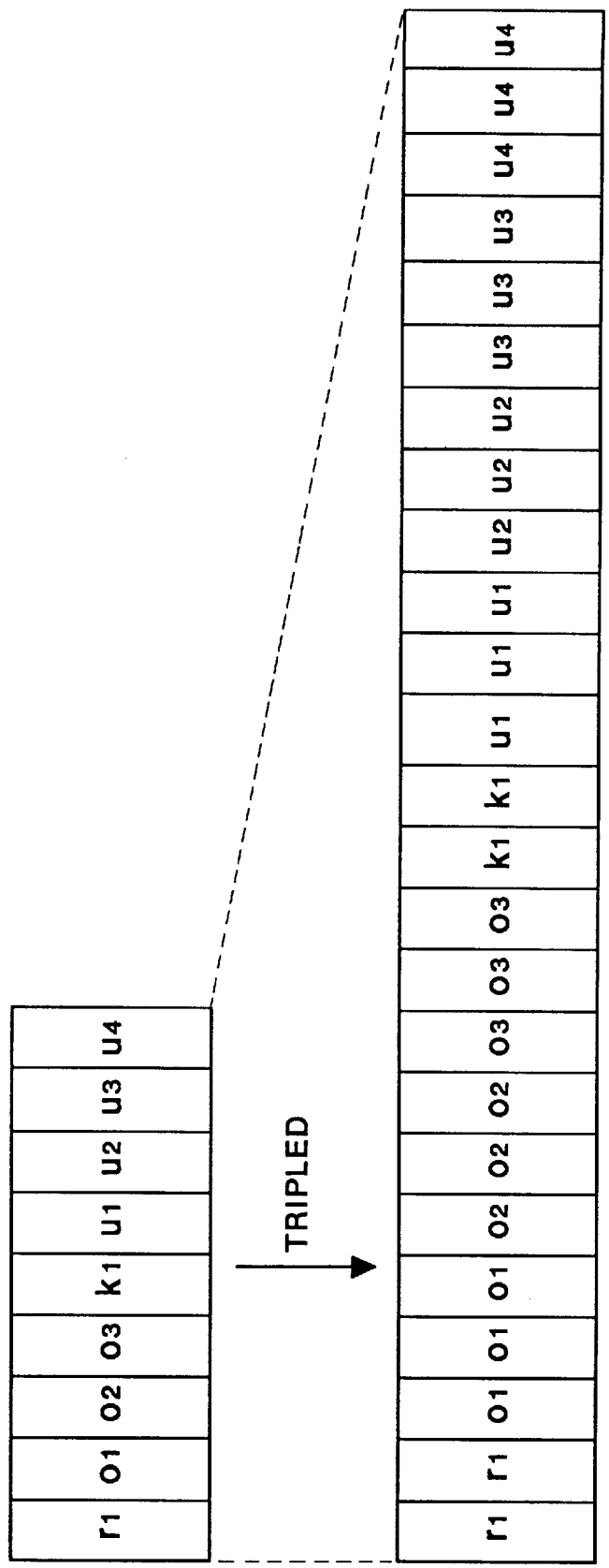
FIG. 5C shows the case in which the uttered time period is tripled in accordance with the magnification shown in FIG. 5B.

FIG. 5B shows the table which lists the factor at which the consonant frame is increased when the time period of the reference pattern is enlarged by increasing the vowel frame by a factor of 2, 3 and 4. FIG. 5C shows an example in which the vowels in "roku" (six) are increased by a factor of three.

The reference word pattern storing unit 103 stores patterns by the unit of word. However, the patterns may also be stored by the unit of clause. Alternatively, a chain of meaningless syllables may also be used. In that case, the unit of the reference word pattern storing unit 103 may be VCV, VCVCV, CV, VV, CVCV and so on, and the unit of reference phoneme pattern storing unit 106 may be CV, VC, V and so on.

[Modifications of Phoneme Recognition]

In the second stage of the basic configuration of the processing system shown in FIG. 1, spotting such as continuous DP is conducted on the candidate words obtained in the first stage thereof by the unit of phoneme (for example, C, V, CV, CVC, VCV and so on), and the results of the spotting is output. However, recognition of the candidate words output from the first stage by the unit of phoneme may also be conducted by the method other than the spotting. The method which is to be described below is the one in which matching is conducted between the word created by connecting the reference phoneme patterns obtained from a plurality of speech samples in accordance with the series of the phonemes of the candidate word and the feature vector of the input speech which is sliced as the speech section. This method also ensures high recognition rate.

Figure 6:
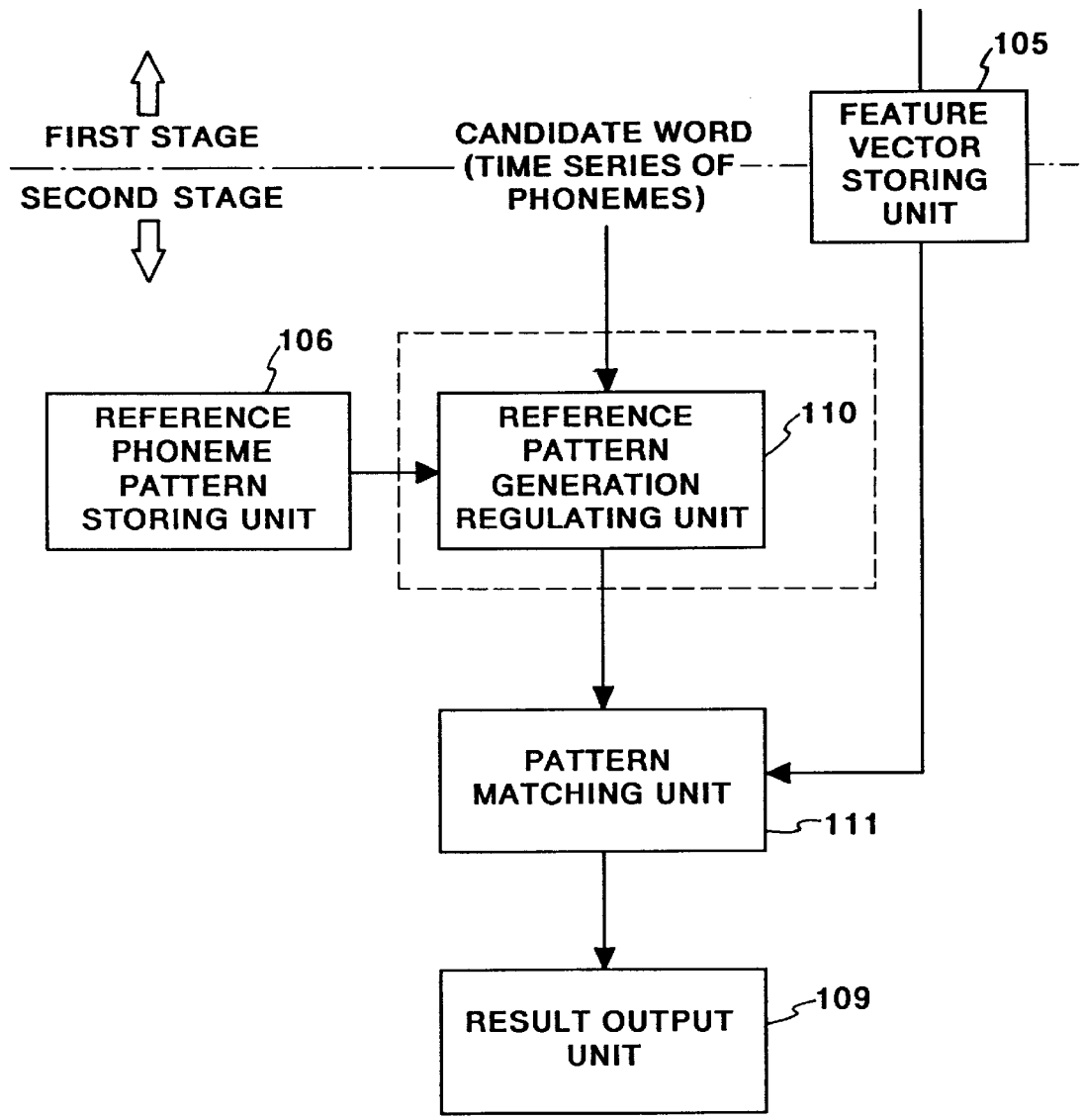
FIG. 6 shows a modification of the first embodiment of FIG. 1.

FIG. 6 shows the basic configuration of the recognition system by the unit of phoneme which adopts the above-described recognition method other than the spotting.

The candidate words discriminated by the candidate word discriminating unit 104 shown in FIG. 1 and the feature vector of the speech section sliced from the input speech are processed by the configuration shown in FIG. 6. First, the feature vector of the input speech is sent to the parameter storing unit 105, and the candidate words are sent to a reference pattern generation regulating unit 110 for connecting the reference phoneme patterns stored in the reference phoneme pattern storing unit 106 in accordance with the time series of the phonemes of the candidate word. Pattern matching between the connected reference phoneme patterns and the feature vector of the input speech is conducted by a pattern matching unit 111. The results of the recognition obtained by the pattern matching are output from the result output unit 109.

FIG. 7 shows a detailed configuration of the reference pattern generation regulation unit 110. First, the time series of the candidate words output from the first stage and the feature vector of the speech section sliced from the input speech are input. In this example, it is assumed that three words, including "tokusimasi (Tokushima City)", "fukusimasi (Fukushima City)", and "hirosimasi (Hiroshima City)", are output as the candidate words when "tokushimasi (Tokushima City)" is audio input. First, the candidate words are each divided into phonemes which are optimal to the continuous speech recognition by a phoneme division unit 150 of the reference pattern generation regulation unit 110. In this example, the phoneme at the beginning of the word is CV (consonant+vowel), and the phonemes in the midst and at the end of the word are VCV (vowel+consonant+vowel).

Next, an average time duration detecting unit 152 obtains the average time duration per mora by dividing the length of the feature parameter of the input speech by the number of phonemes. The obtained average time duration is used for selection of a suitable reference phoneme pattern from the plurality of reference phoneme patterns having different time periods.

Figures 8A, 8B:
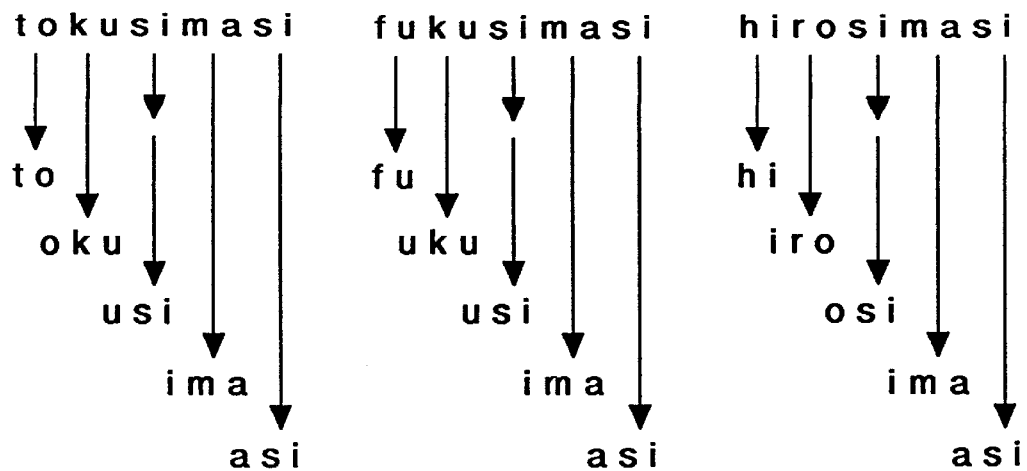
FIG. 8A shows phoneme analysis of candidate words.
FIG. 8B shows the addresses of the reference patterns of individual phonemes in the candidate words.

FIG. 8A shows examples of division of the candidate words into phonemic symbols by the phoneme division unit 150. FIG. 8C is a table in which the phonemes are made to correspond to the addresses of the memory which stores the reference patterns. A phoneme position label affixing unit 151 conducts selection from the plurality of reference phoneme patterns in correspondence to the phonemic position of the candidate word. When an address is expressed by $(D_1-D_2 \cdot D_3)$, $D_1$ represents the type of phoneme, $D_2$ represents the time period of the reference phoneme pattern, and $D_3$ represents the type of reference phoneme patterns. The reference pattern of, for example, phoneme |a|, is stored starting from address 001-1. At address 001-1.1, the reference pattern of voiceless |a| is stored. In the case of the VCV type phoneme, such as |asa|, the standard type is stored at address 931-1, the phoneme in which VCV is voiceless is stored at address 931-1.1, the phoneme in which only CV is voiceless is stored at 931-1.2, and the phoneme in which VC is voiceless is stored at 931-1.3. For other phonemes, a plurality of reference patterns are also present for each phoneme.

FIG. 8B shows the phonemes obtained when the time period ($D_2$) of the phoneme reference pattern of the three candidate words is 1, as well as the addresses thereof. In this example, conforming to the rule that the patterns in which the vowel at the beginning of the word and the vowel at the end of the word are voiceless are also included, four combinations of pattern, shown in FIG. 8D, are available for the word "tokusimasi" using the addresses of the phonemes shown in FIG. 8B.

The reference patterns can be connected only when voiced or voiceless state of the latter half of the previous phoneme and voiced or voiceless state of the former half of the following phoneme are the same. FIG. 8E shows combinations that can be connected by means of the type of phoneme reference pattern $D_3$. In FIG. 8E, the time period $D_2$ of the reference pattern of a certain phoneme and the type $D_3$ thereof are shown. (b/b) listed at the top column shows the connection of the reference patterns of certain phonemes having a voiced certain time period (=b). (b/b.2) listed on the subsequent column shows the connection of b of the reference pattern of a certain phoneme having a voiced time period (=b) and (b.2) of the reference pattern of a certain phoneme in which the former half of the time period (=b) is voiced sound and in which the latter half is a voiceless sound. Since a connection is possible under the condition that the former half of a following phoneme is the same as the latter half of the previous phoneme, it is not necessary to show $D_1$ in FIG. 8E. The time period $D_2$ of the reference pattern of a phoneme is b, which is obtained in the form of an average time duration per mora by the average time duration detection unit 152, and is constant in that word. The phoneme connection rule shown in FIG. 8E is only part of a large number of phoneme connection rules. There are also acoustic phoneme connection rules.

FIG. 8D shows combinations of only "tokusimasi". Combinations of other candidate words are also created similarly. Once combinations of the phoneme reference patterns are created, a phoneme reference pattern connecting unit 153 connects the phoneme reference patterns to create the word reference pattern. Suitable connection methods include direct connection and linear interpolation. The method of connecting phonemes, O, P, Q, and R will be described below with reference to FIG. 9.

Figure 9B:
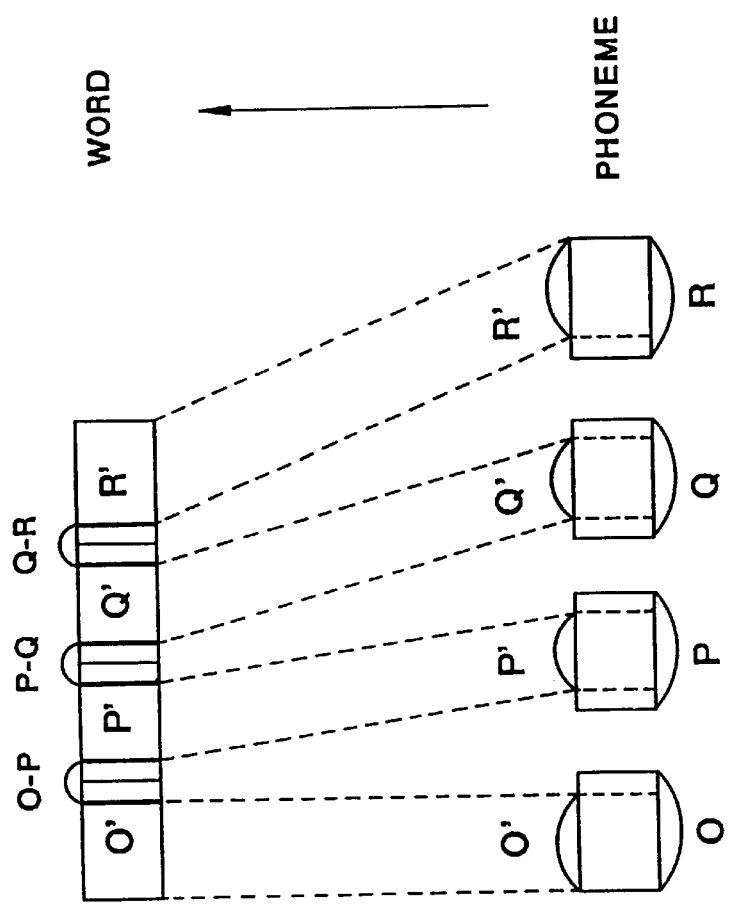
FIGS. 9A and 9B show an interpolation method.
Figure 9A:
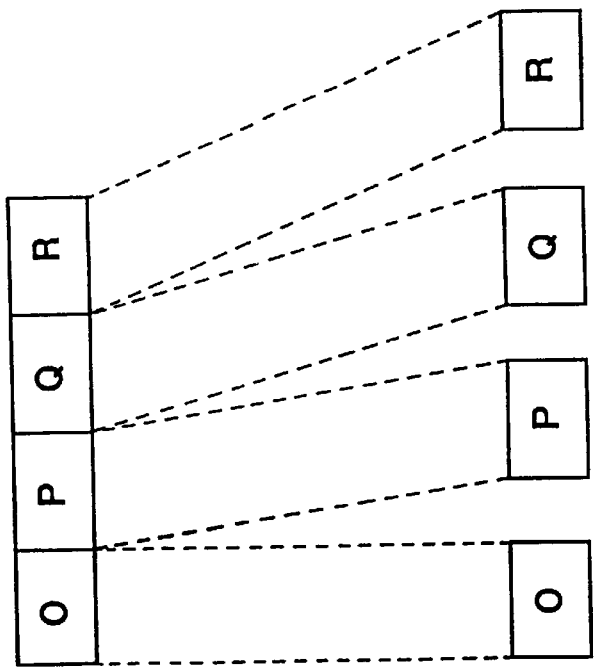

FIG. 9A shows an example of direct connection, and FIG. 9B shows an example in which a continuous word reference pattern is generated by slicing a few frames of the vowel portion from phonemes O, P, Q, and R as interpolating portions, O', P', Q' and R' and by linearly interpolating the empty space by the feature vector of each dimension.

A suitable method of interpolating phoneme is determined by the property of the feature vector. In this example, the interpolation method optimal to the feature vector is used. Finally, matching is performed between the plurality of word reference patterns output from the phoneme reference pattern connecting unit 153 and the input pattern by the pattern matching unit 111. A word whose distance is at a minimum is output from the result output unit 109 in the form of, for example, speech.

Although several types of pattern matching, such as linear expansion/compression and DP matching, are known, DP matching assures the excellent results. Static distance, such as the Mahalanobis distance, is used as the scale of distance.

As will be understood from the foregoing description, in the first embodiment, word spotting is conducted by continuous Mahalanobis DP by the unit of word in the first stage to select candidate words and to slice the speech section simultaneously.

In the second stage, matching is conducted by the unit of phoneme, by which a high recognition rate is obtained.

Since the reference patterns in a plurality of environments are prepared by the unit of phoneme not by the unit of word, the amount of information can be reduced.

Furthermore, in the second stage, matching is conducted only on the candidate words. It is therefore possible to save time.

<Second embodiment>

Now, a second embodiment of the present invention will be described with reference to FIG. 10 which shows the basic configuration thereof. The components having the same functions as those of the first embodiment shown in FIG. 1 are denoted by the same reference numerals. A description will be provided on the components which characterize the second embodiment.

A reference phoneme pattern storing unit 206 stores reference phoneme patterns categorized by the speaker. The reference phoneme pattern storing unit 206 supplies the reference phoneme pattern corresponding to a recognized speaker category to an optimal speaker reference phoneme pattern storing unit 212.

A speaker category recognition pattern storing unit 210 stores patterns used for discriminating the speaker category which is optimal to the speaker of a currently input speech from the speaker categories obtained by classifying a plurality of reference phoneme patterns in accordance with the features of various speakers such that the speaker categories correspond to a plurality of reference patterns prepared for a plurality of speakers.

A process selecting unit 211 selects the reference pattern to be compared with an input speech by the optimal speaker reference phoneme pattern storing unit 212 which will be described later. In the phoneme recognition conducted in the second stage shown in FIG. 10, the process selecting unit 211 selects the optimal phoneme group from the reference phoneme pattern storing unit 206 and stores it in the optimal speaker reference phoneme pattern storing unit 212.

The optimal speaker reference phoneme pattern storing unit 212 stores the reference phoneme pattern for the optimal speaker category upon instruction by the process selecting unit 211.

A feature parameter used in the first embodiment can also be used in the second embodiment. A parameter of difference or power information of spectrum may be combined with the feature parameter obtained from the spectrum information to obtain a feature vector.

In this embodiment, the length of the analysis window is set to 25.6 msec, and the frame period is set to 10 msec. Melcepstrum factor is obtained from the envelope spectrum which passes through the peak of the FFT spectrum. The first to eighth dimensions of the factor are used.

A regression coefficient of the first dimension is obtained as the difference information between the adjacent melcepstra. First to eighth dimensions of the regression coefficient are used so that a total of sixteen features can be used as the feature vector for one frame. The zero dimension of melcepstrum represents power (in this embodiment, power information is not used).

Next, the method of creating the reference patterns stored in the reference word pattern storing unit 103 will be described below. In this system, recognition of a total of seventeen words, including "zero (zero), san (three), ni (two), rei (zero), nana (seven), yon (four), go (five), maru (zero), shi (four), roku (six), ku (nine), haci (eight), shici (seven), kyu (nine), ici (one), hai (yes) and iie (no), and deformed speeches thereof, is conducted. The reference pattern is created from the words uttered by a large number of speakers. In this embodiment, speech samples of five thousand people are used to create the reference pattern of one word.

In this embodiment, reference patterns of seventeen words are created and stored to accomplish recognition of only seventeen words. However, the number of words that can be recognized is not limited to this, but recognition of a given number of words is possible by creating that number of patterns.

Furthermore, a reference pattern created by connecting average values of phonemes stored in the reference phoneme pattern storing unit in accordance with a predetermined regulation may also be used as the reference word pattern. A plurality of types of reference patterns, classified according to the speaker, may also be used.

The procedure of creating the reference word pattern is the same as that shown in FIG. 2 with the exception that in step S203 i=5000?.

In the speech recognition apparatus of this embodiment which recognizes the word or sentence uttered by an unspecified speaker, the category which a currently input speaker belongs to is learned before the objective speech is recognized, and recognition is then made in the second stage using the optimal reference phoneme pattern for that speaker selected from along a plurality of groups of reference phoneme patterns so as to increase the recognition accuracy.

Figure 11A:
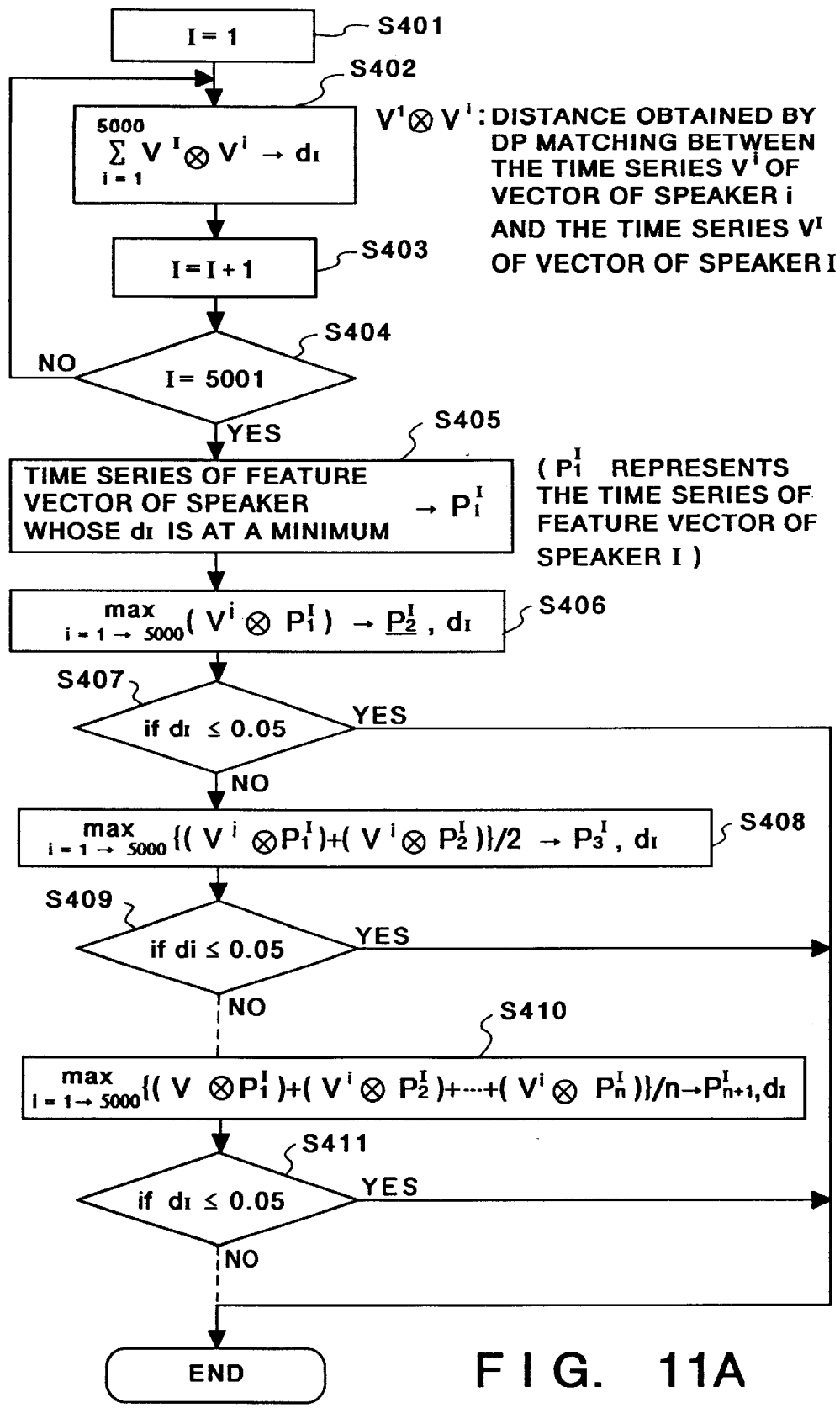
FIG. 11A is a flowchart of a speaker category creating procedure.

The method of creating the speaker category recognition pattern will be described with reference to FIG. 11A. First, the time series of the feature vectors obtained by analyzing "a, i, u, e, o" slowly and continuously uttered by five thousand speakers are classified into a given number of categories. In this embodiment, classification is made into 'n' classes. Clustering technique is used for classification. Any of various types of techniques can be used. In FIG. 11A, the most average speaker is selected from among five thousand speakers in steps S401 to S405, and a speaker who uttered the speech whose feature vector has the largest DP distance from the feature vector of that average speaker is selected as $I_2$ (S406).

Figures 11B, 11C:
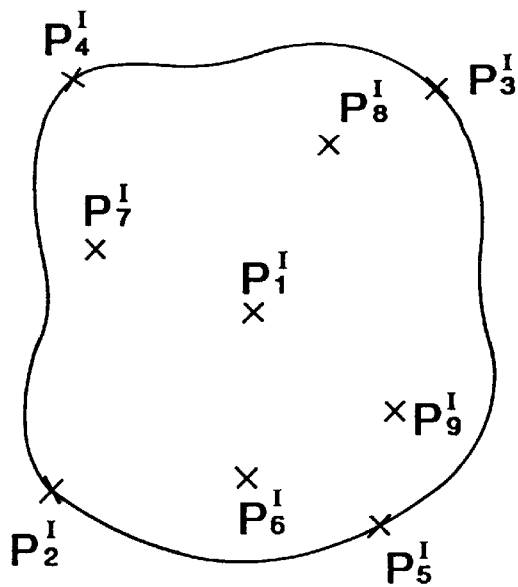
FIG. 11B shows the concept of a speaker category.
FIG. 11C shows an example of a feature vector.

Next, a speaker $I_3$ having the largest DP distance (normalized value) between speakers $I_1$ and $I_2$ is selected, and thereafter the above-described process is repeated until the DP distance is equal to or lower than a predetermined standard value, for example, 0.05. In this embodiment, nine speakers from $I_1$ to $I_9$ are named as samples of the category. The concept of the speaker category is shown in FIG. 11B, and an example of representing the speaker category by the feature vector symbol is shown in FIG. 11C.

Next, a reference pattern of a continuously uttered word "a, i, u, e, o" is created in accordance with the flowchart shown in FIG. 11A using the time series of the feature vector of the speaker who is the core of the category (hereinafter referred to as a core speaker) as the core pattern. In S202 shown in FIG. 11A, DP matching is conducted to obtain the variance/covariance vector of the corresponding frame along the DP path. Restriction of the DP window or the DP inclination is slightly narrowed to provide a reference pattern.

A better reference pattern having a relatively small variance can be created for each category with the core speaker as the center thereof by limiting the number of speakers.

A group of speakers used when the reference pattern corresponding to the speaker category is created with the core speaker as the core pattern is hereinafter referred to as a category speaker group.

The word distance calculating unit 102 by continuous Mahalanobis DP performs matching by continuous Mahalanobis DP between the time series of the feature vector input in sequence and the reference patterns of all the words or phonetic sound chain stored in the reference word pattern storing unit 103 or in the speaker category recognition pattern storing unit 210, and calculates the distance.

Calculation of the distance by the word distance calculating unit 102 by continuous Mahalanobis DP and discrimination by the candidate word discriminating unit 104 are conducted in the same manner as in the first embodiment.

In this embodiment, reference patterns of phonemes, including vowels (a, i, u, e, o) and consonants (z, s, n, r, g, m, shi, k, h, ci), are stored in the reference phoneme storing unit 206 beforehand.

In this embodiment, fifteen types of phonemes are stored in the reference phoneme pattern storing unit 206 to achieve recognition of the aforementioned seventeen words. However, the objective of recognition can be enlarged and the number of reference patterns can be increased by creating the reference patterns of the phonemes which constitute the reference word patterns in the same manner and by storing the created reference patterns in the reference phoneme pattern storing unit 206.

In this embodiment, phonemes are sliced from the words uttered by the speakers in the category speaker group used for creating the category reference patterns, and clustering is performed on the group of the same phonemes to create a plurality of reference phoneme patterns for each class.

FIG. 12A shows storage of the plurality of reference phoneme patterns. The phonemes (for example, /a/) are sliced from the category speaker group which belongs to the speaker category.

Thereafter, clustering or the like is performed on the phonemes to create at least one reference pattern for phoneme /a/. In FIG. 12A, in the case of the speaker category 1, reference phoneme patterns corresponding to a plurality of phoneme classes are stored, like /$a_1$/ and /$a_2$/ for /a/, and /$u_1$/, /$u_2$/, and /$u_3$/ for /u/. For example, the same phoneme may differ greatly depending on the difference in the phonetic sound surrounding that phoneme, caused by the difference in the position where that phoneme appears in the word, or on a difference in the vocalization made by the same speaker. For example, /$a_1$/ represents a voiced 'a', and /$a_2$/ represents a voiceless 'a'.

In this method, phonemes are sliced from the words classified by the speaker category, and clustering or the like is then performed to create a plurality of reference phoneme patterns to attain a higher recognition accuracy.

The reference phoneme pattern group, corresponding to the optimal speaker category selected from those stored in the speaker category recognition pattern storing unit 210, is transferred from the reference phoneme pattern storing unit 206 to the optimal speaker phoneme reference pattern storing unit 212 by means of the process selecting unit 211 for storage.

The phoneme distance calculating unit 107 by continuous Mahalanobis DP performs matching between the phoneme ranges sliced as the candidate words stored in the feature vector storing unit 105 and the phonemes.

Calculation of the distance by the phoneme distance calculating unit 107 by continuous Mahalanobis DP and discrimination by the word word discriminating unit 108 by the unit of phoneme are conducted in the same manner as in the first embodiment.

The phoneme recognition method shown as the modification of the first embodiment may also be used.

The process selecting unit 211 selects either the speaker category recognition pattern storing unit 210 or the reference word pattern storing unit 103 as the objective of matching made on the input speech, and thereby discriminates the speaker category to which the currently input speaker belongs.

Figure 13:
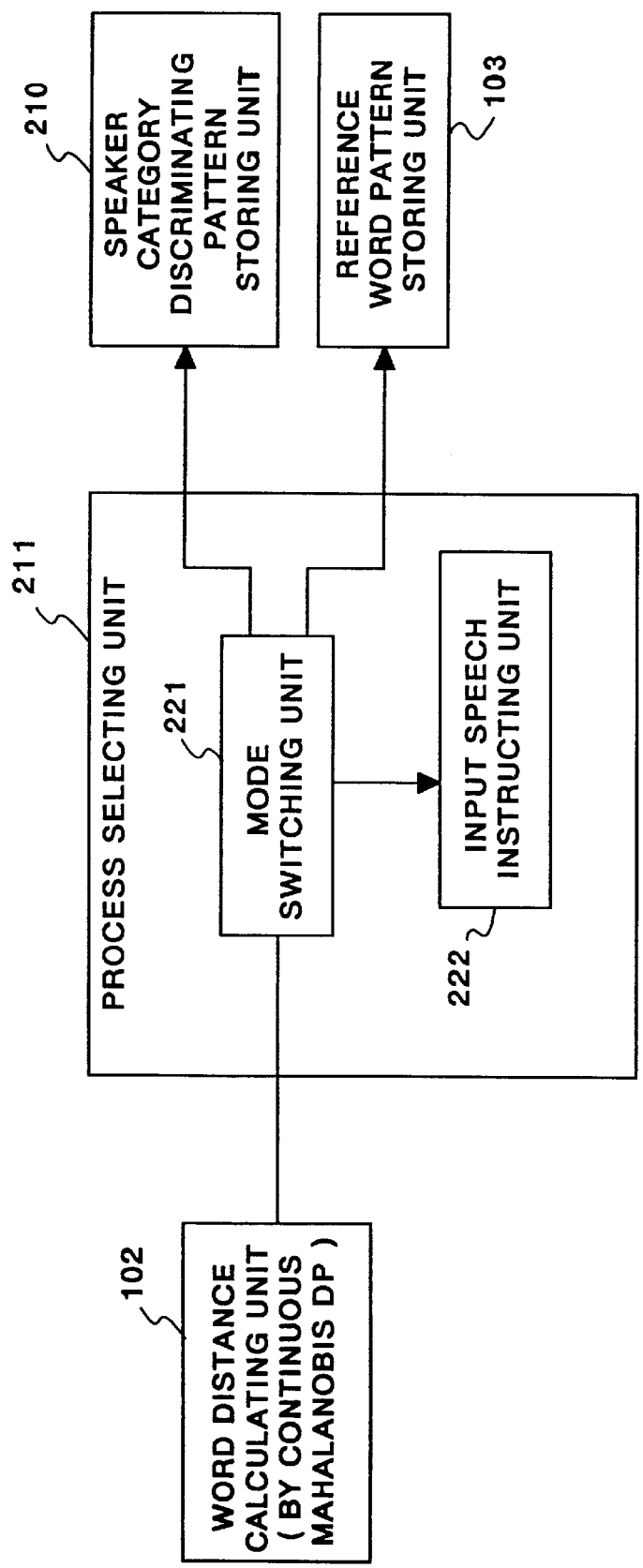
FIG. 13 shows the internal configuration of a process selecting unit.

FIG. 13 shows the internal configuration of the process selecting unit 211.

Figure 14:
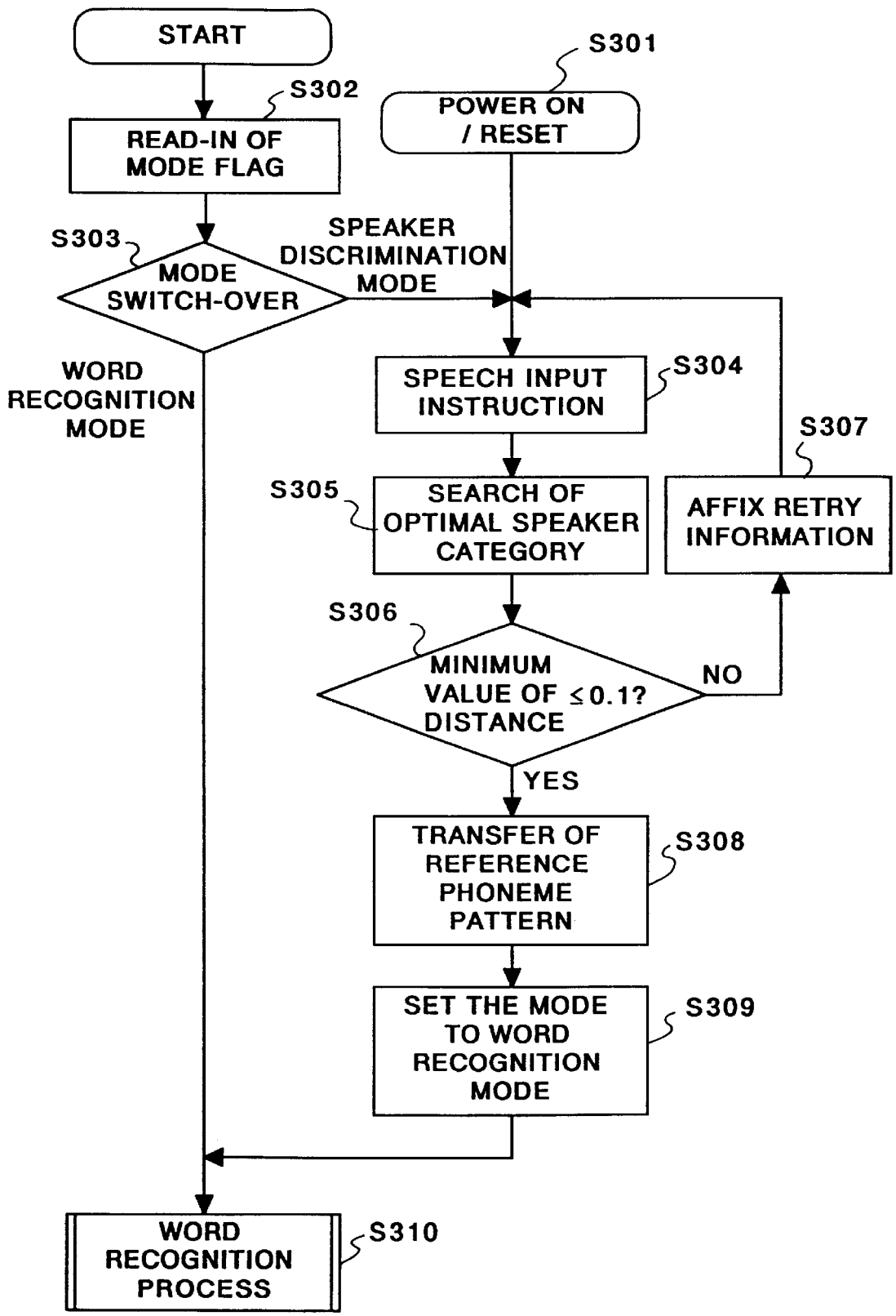
FIG. 14 is a flowchart of the entire flow of the second embodiment of the present invention.
Figure 15:
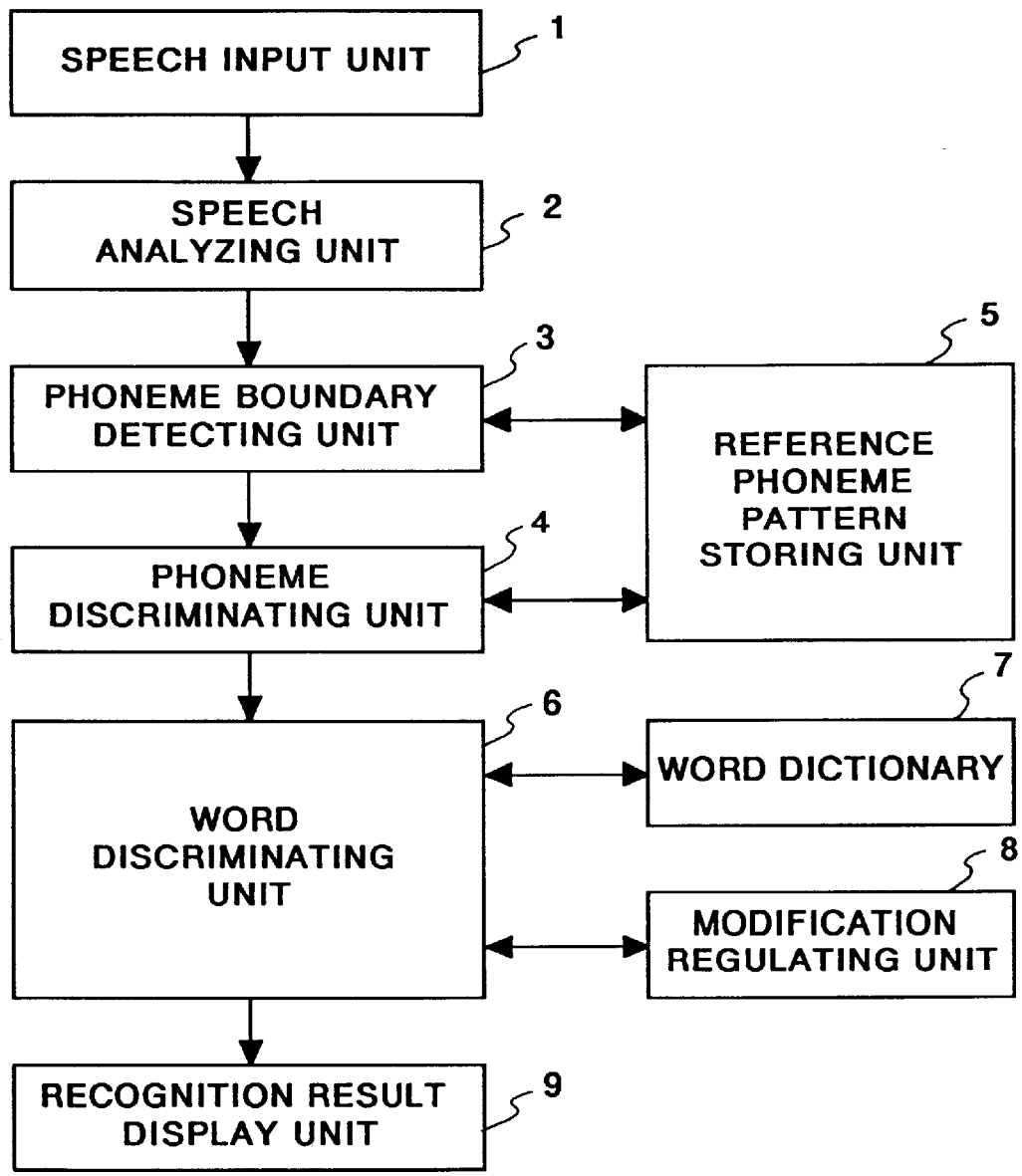
FIG. 15 shows the configuration of a conventional speech recognition system.

FIG. 14 is the flowchart of the operation conducted by the process selecting unit 211.

When the speech recognition process is started (S301), since the operation mode is in the speaker discrimination mode, the process goes to S304. However, an input speaker may change or the operation mode may be returned to the speaker discrimination mode. In that case, the speaker can set the mode flag by himself. The mode flag of a mode switching unit 121 is read in (S302). If the mode flag is the word recognition mode, the operation mode is switched to word recognition mode by the mode switching unit (S303), and word recognition with an input speech as an objective word is performed, as stated above (S310). If it is determined as the speaker discrimination mode (S303), an instruction is given to the speaker by means of instruction means, such as a display or a speech synthesis means, like "say a, i, u, e, o" (S304). Thereafter, the optimal speaker category is searched for (S305), and it is determined whether or not the distance is 0.1 or less (S306). If the answer is negative in step S306, it is determined that the time period or intensity of utterance of the speaker deviates excessively from the standard value. Therefore, re-try information is affixed (S307), and re-input is recommended (S304). At that time, the input speech instructing unit may give an instruction to the speaker by uttering, for example, "Continuously and slowing speak a, i, u, e, o. Start now". After the category is specified from among the speaker categories $I_1$ to $I_9$, the reference phoneme pattern created using the speaker who is the core speaker of the specified category as a core pattern is transferred (stored) from the reference phoneme storing unit 206 to the optimal speaker phoneme reference pattern storing unit 212 (S308).

After the speaker category is specified, the word recognition mode is set as the mode flag (S309), and word recognition process is started (S310).

In the above-described embodiment, matching by the continuous Mahalanobis, which employs the Mahalanobis distance as the scale for absorbing statistically unspecified property, is used as pattern matching. However, in the recognition made in the second stage, any matching which employs scale for absorbing unspecified property using probability, such as the Marcor Model, will be used.

In this embodiment, a continuously uttered word, "a, i, u, e, o", is used as the phonetic sound chain for discriminating a speaker group. However, other types of words may also be used. A plurality of words may also be used. For example, a combination of words A (which contains a vowel), B and C may be used. In that case, word A is used to classify the speakers by the basic feature (the length of formant peak or the like), and words B and C are used to further classify the speakers by the features which characterize the individual speakers (1. whether or not "buzz" readily enters a voiced sound, 2. the length of the consonant, such as p, t, or k, 3. the average speaking speed, and so on).

In the above embodiment, the phonemes contained in the words, which are the objectives for recognition conducted in the recognition apparatus according to the present invention, are stored in the reference phoneme pattern storing unit. However, reference phoneme patterns of all the phonemes contained in the Japanese language may be stored in a state in which they are classified by the speaker category or phoneme class, (in a case where the Japanese language is to be recognized). This may increase the amount of data stored in the memory of the reference phoneme pattern storing unit 206, but may allow the words to be recognized to be changed only by storage of reference patterns of the plurality of phonemes used in those words, corresponding to the speaker category, in the optimal speaker's reference phoneme pattern storing unit 212.

Furthermore, all the phonemes contained not only in the Japanese language but also other languages (English, French, German, Chinese and so on) may also be stored so that the language to be recognized can be selected from among these languages.

In that case, the types of phoneme are increased, as shown in FIG. 12B, for each language.

As will be understood from the foregoing description, in this embodiment, spotting is performed by the unit of a word to obtain the speech section and the candidate words in the first stage, and comparison is made in the second stage between the candidate words and the reference phoneme patterns prepared in a plurality of numbers for respective characteristics of the speeches to achieve more accurate speech recognition and thereby enhance the recognition rate.

It is understood that various changes and modifications may be made in the invention without departing from the spirit and scope of of appended claims which delineates the inventive concepts of the present invention.

What is claimed is:

1. A speech recognition method comprising the steps of:

inputting speech into a speech recognition apparatus;

discriminating a candidate word included in the inputted speech based on a similarity obtained by matching the inputted speech and reference words stored in a word dictionary, and assigning a candidate word code to the candidate word;

decomposing the candidate word discriminated in said discriminating step into a plurality of obtained phonemes in accordance with the candidate word code, and assigning a phoneme code to each of the plurality of phonemes;

generating a word by connecting a plurality of reference phoneme data stored in a phoneme dictionary, each being selected to correspond to each of the phoneme codes assigned in said decomposing step; and recognizing a word included in the input speech based on a similarity obtained by matching the inputted speech and the generated word.

2. A speech recognition apparatus comprising:

a word dictionary for storing a plurality of reference words;

input means for inputting speech;

discriminating means for discriminating a candidate word based on a similarity obtained by matching the inputted speech and the plurality of reference words stored in said word dictionary, and for assigning a candidate word code to the candidate word;

decomposing means for decomposing the candidate word discriminated by said discriminating means into a plurality of phonemes obtained in accordance with the candidate word code, and for assigning a phoneme code to each of the plurality of phonemes;

a phoneme dictionary for storing reference phoneme data;

means for reading out reference phoneme data from said phoneme dictionary corresponding to each of the plurality of phoneme codes, that are products of the decomposing and assigned by said decomposing means, and for generating a word by connecting the reference phoneme data that is read out; and recognizing means for recognizing a word included in the inputted speech based on a similarity obtained by matching the inputted speech and the generated word.

* * * * *

UNITED STATES PATENT AND TRADEMARK OFFICE
CERTIFICATE OF CORRECTION

PATENT NO.     : 6,236,964 B1
DATED          : May 22, 2001
INVENTOR(S)    : Junichi Tamura et al.

It is certified that error appears in the above-identified patent and that said Letters Patent is hereby corrected as shown below:

<u>Column 4,</u>
Line 52, ""procunciation" should read -- "pronunciation --.

Signed and Sealed this

Nineteenth Day of March, 2002

Attest:

JAMES E. ROGAN
Attesting Officer  Director of the United States Patent and Trademark Office